Nov. 28, 1944.    F. H. BEALL    2,364,019
TWO-WAY OVERRUNNING CLUTCH
Filed Oct. 14, 1943    2 Sheets-Sheet 1

INVENTOR.
Frank H. Beall
BY
C. E. Herrstrom +
H. E. Thibodeau
ATTORNEYS

Nov. 28, 1944.  F. H. BEALL  2,364,019
TWO-WAY OVERRUNNING CLUTCH
Filed Oct. 14, 1943  2 Sheets-Sheet 2
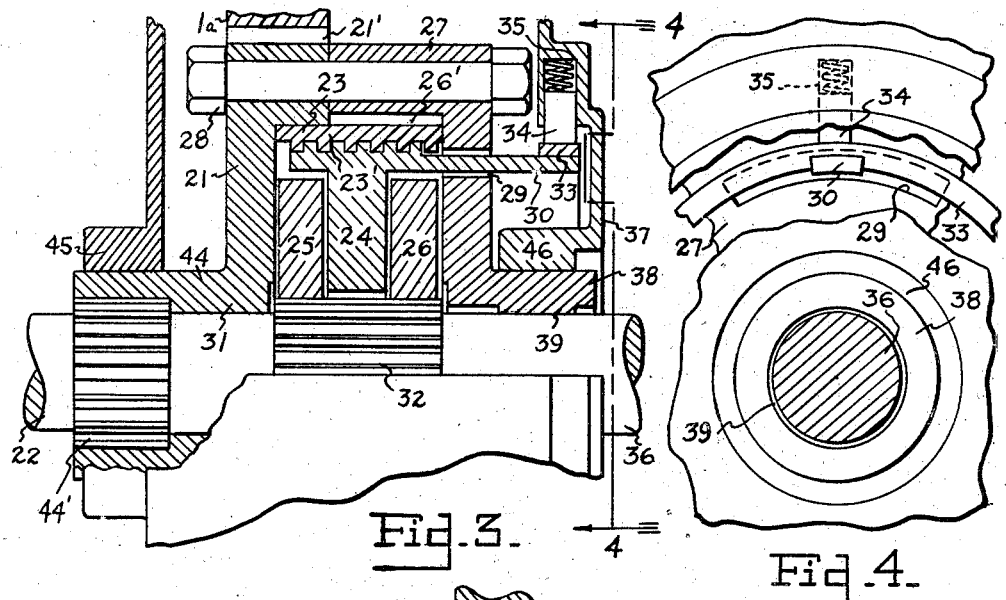
Fig. 3.
Fig. 4.
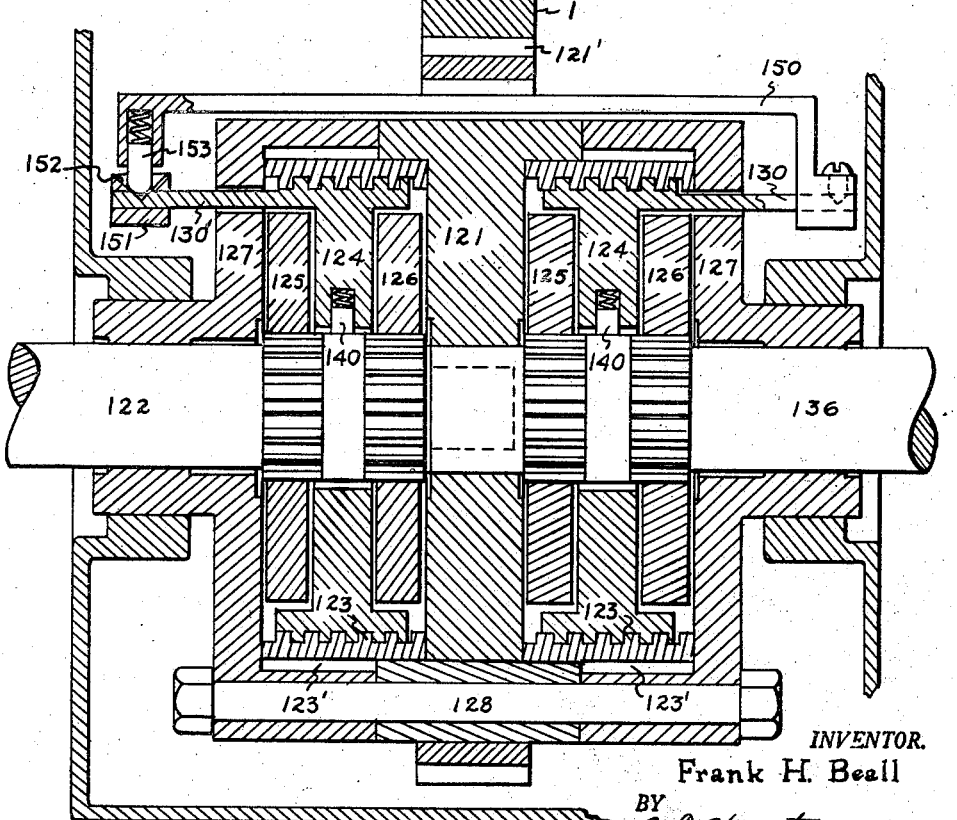
Fig. 5.
INVENTOR.
Frank H. Beall
BY
C. E. Herrstrom
H. E. Thibodeau
ATTORNEYS Patented Nov. 28, 1944

2,364,019

UNITED STATES PATENT OFFICE 2,364,019

TWO-WAY OVERRUNNING CLUTCH

Frank H. Beall, Detroit, Mich.

Application October 14, 1943, Serial No. 506,229

18 Claims. (Cl. 192—54)

This invention relates to an overrunning clutch and more particularly to a clutch which will transmit the power from the driving member to the driven member in both directions of drive of the driving member.

In four wheel drives for military vehicles it is customary to connect the front and rear final drives without using a differential so as to insure positive drive to both axles. Even though the tires may be inflated to the same size, there always is a differential action on turns, since the front wheels turn on a larger arc and tend to overrun the rear wheels, causing tire fight which is not only very detrimental as to tire wear, but makes steering more difficult.

This can be overcome by inserting a free wheeling clutch of a well known type in the forward drive, but such an expedient is open to the objection that reverse drive is only on the rear wheels. Further, the free-wheeling clutch is behind the transmission, and the rollers in the free wheeling unit would be under very heavy load in lower gears. Clutches of this type are not very satisfactory under heavy loads as the stresses on the line of roller contact are very high for a clutch of reasonable size.

The object of the invention is to overcome the above deficiencies in the standard free-wheeling clutch for operation under heavy loads such as on four wheel drive trucks.

Another object of the invention is to provide a clutch plate which will be self-aligning to compensate for any small angular variation between the driving and driven shafts and thus prevent excessive pressures on one edge of the clutch plates, particularly on forward drive. Such a construction will not require the high degree of precision that is necessary for the roller type free-wheeling unit for proper functioning.

Another object is to provide a clutch which will produce no thrust on either the driving or driven shaft.

Another object is to produce a clutch of the screw and nut type that will relieve the screw of having to transmit the total torque through the threads thereby producing excessive pressures through the wedging action.

In the drawings

Figure 3 is a similar view of another modification in which the housing constitutes the driving member and where both forward and rear drive are self-aligning;

Figure 4 is a section on the line 4—4 of Figure 3, and

Figure 5 is a sectional view showing the application of the clutch of Figure 3 to provide free-wheeling to both the forward and final drive.

Figure 1:
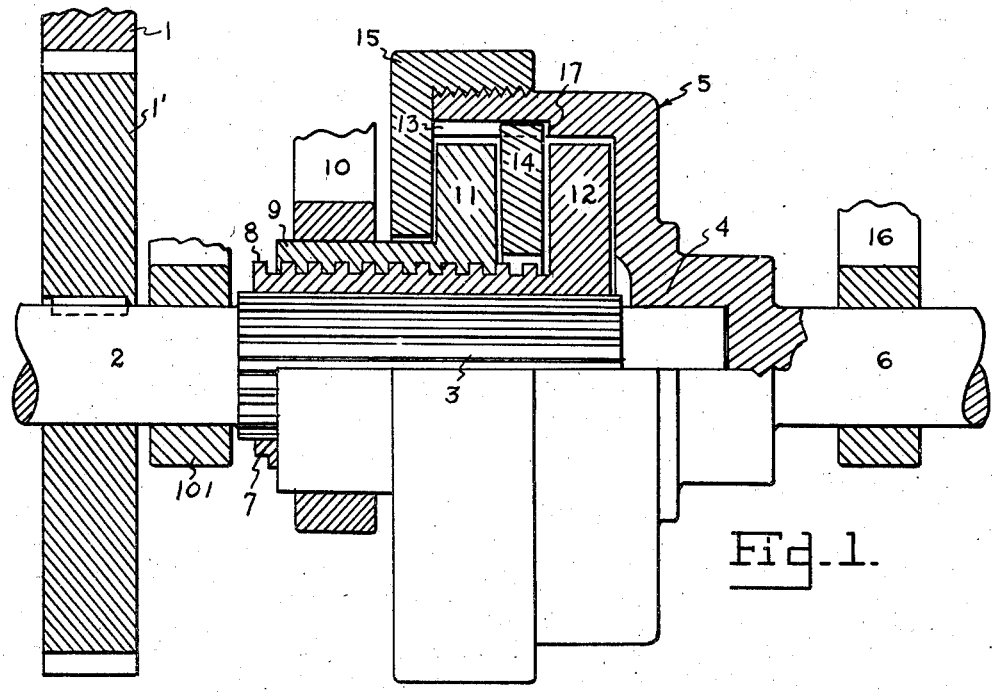
Figure 1 is a sectional view, partly in elevation of the clutch applied to the forward propeller shaft of a four wheel drive.

Referring to Figure 1, the drive is through gears 1 and 1' in the transfer case (not shown) to driving shaft 2 which is straight splined at 3 and has its free end received in a bearing 4 in a housing 5 fixed to the end of the driven shaft 6. Mounted on the splines 3 on shaft 2 is a slidable sleeve 7 formed on the outside with a thread 8. Mounted on this thread is a sleeve or nut 9 which is received in a fixed bearing 10. The shaft 2, may also be received in a fixed bearing 101, if desired. Within the housing 5, clutch plates 11 and 12 are formed on the nut 9 and sleeve 7 respectively and are separated by a clutch plate 14 mounted on internal splines 13 in housing 5. The rear end of housing 5 is closed with a cap 15 loosely surrounding the nut 9. The driven shaft 6 may be mounted in a bearing 16.

The operation of the device is as follows:

In forward drive the friction of bearing 10 will screw nut 9 forward against clutch plate 14, forcing it against a stop shoulder 17 formed in the housing 5. The bearing 10 acts as a drag device for the nut 9, or a different drag device of suitable design may be used, if bearing 101 is used. The sleeve 7 will then be drawn rearward on spline 3 by the thread, thus clamping clutch plate 14 between clutch plates 11 and 12. In this operation the plate 11 functions as an actuating element. Since clutch plate 14 is mounted in splines it can have a slight tilt to compensate for any small misalignment of shafts 2 and 6. If the plate 14 were rigid the pressure on the clutch faces would tend to align the shafts and thus put pressure on the bearings opposing such action.

Since the driving friction on plate 14 is obtained by screwing plates 11 and 12 together by the thread 8, this force holding plates 11 and 12 against plate 14 will release as soon as the shaft 6 tends to overrun the shaft 2, the pitch of thread 8 being such that the sleeves 7 and 9 will move under a load unless urged in thrust position. However, the clutch plates 11 and 12 will be continually in light frictional contact with plate 14 due to the friction of bearing 10 urging them in this relation and will immediately tighten up again without any overrun as soon as shaft 6 slows down and shaft 2 becomes the driver.

In reverse drive the friction of bearing 10 urges nut 9 rearward so that clutch plate 11 comes in contact with cap 15, whereupon the sleeve 7 moves forward so that clutch plate 12 contacts the inner clutch face of housing 5 to transmit the power for reverse drive. While in reverse this design is not self-aligning; any additional pressure put on the bearings due to slight misalignment is not serious as reverse driving is always quite limited.

The clutch faces of plates 11 and 12 should be slightly corrugated so as to permit a free escape of oil on clutching engagement. If desired, friction faces may be used.

A design feature is the pitch of thread 8. In forward drive the clamping pressure produced by nut 9 will increase only until the pressure is sufficient for the friction between members 11 and 14 plus the friction between members 12 and 14 to take the load. A large part of the torque will be transmitted through member 12 mounted on straight splines 3. The same is true on reverse. Thus a relatively small angle of inclination of the threads is possible, the only requirement being that this angle be sufficiently large to be self-releasing. This angle for metal to metal has a minimum of about 14°. The use of such a relatively small angle will assure positive clutching and eliminate the delicate oiling problem such as exists in roller clutches or the ordinary screw and nut clutch where the threads had to be given an angle of inclination as great as possible to prevent excessive wedging pressures when a heavy load is transmitted through the threads alone.

Figure 2:
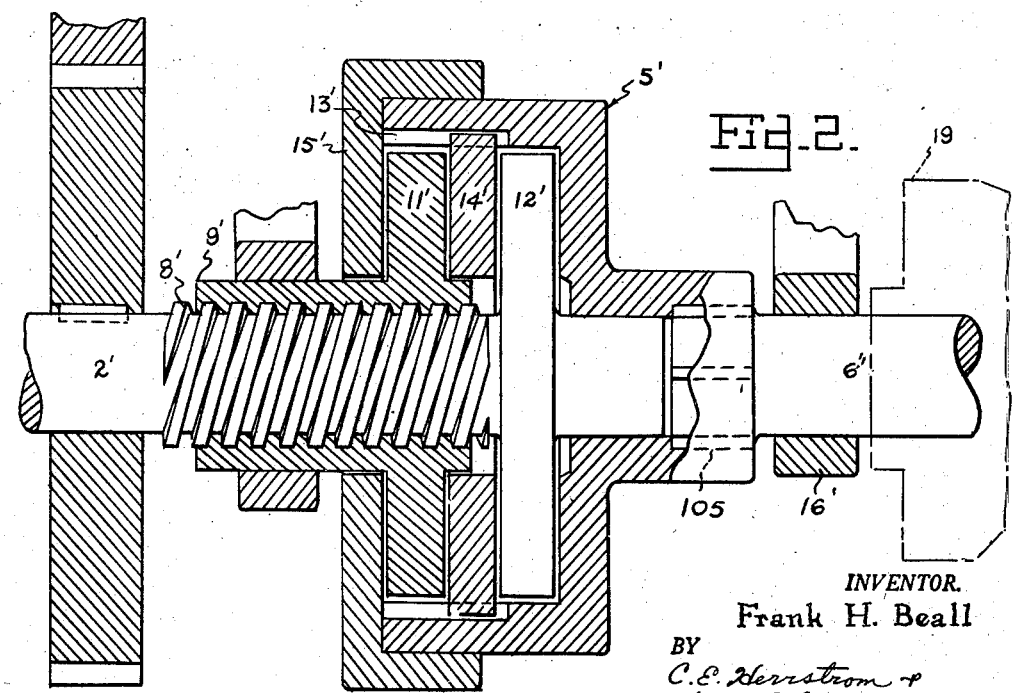
Figure 2 is a similar view of a modified construction.

The form shown in Figure 2 can be used where shaft 6¹ and housing 5' are permitted to have a small axial movement such as could be afforded by the splines in the standard universal joint indicated at 19. In this design sleeve 7 of Figure 1 is omitted and nut 9' is mounted on threads 8' cut directly on the driving shaft 2¹. The nut 9' is formed with a clutch plate 11'. A clutch plate 12¹ is integral with or immovable on shaft 2¹. Forward drive clamps clutch plate 14¹, mounted on splines 13¹ in housing 5', between clutch plates 11¹ and 12¹. Reverse drive engages plate 11' with cap 15' and housing 5' with plate 12'. If it is not desired to permit shaft 6' to have a slight longitudinal movement in bearing 16', housing 5¹ could be connected to shaft 6' by a splined joint indicated at 105, permitting the housing to slide without the shaft.

The form shown in Figure 3 comprises a housing 21 with a ring gear 21¹ meshing with a drive gear 1ª. This form could be installed directly in the transfer case and thereby not decrease the length of the forward propeller shaft. A hub 44 on housing 21 is keyed or splined at 44' to drive the rear propeller shaft 22 through the customary universal joint. In casing 21 is fitted a cylinder 23 having an internal thread 23¹, cooperating with an externally threaded clutch sleeve or nut 24. At opposite sides of the nut 24 are clutch plates 25 and 26 splined to driven shaft 36 by splines 32. At its inner end the shaft 36 projects into a bearing 31 in hub 44 of housing 21. Mounted on splines 26' on the outside of cylinder 23 is the cap 27. This cap is firmly fastened to casing 21 by bolts 28. Cap 27 is formed with a suitable number of equally spaced circular slots 29 through which project extended portions 30 of the clutch sleeve 24 forming key shaped spline members on which is mounted a ring 33 for a spring-pressed friction member 34 in cylinder 35 fixed to transfer case 37. This mechanism exerts a drag on the actuating member 24.

In operation, the retarded nut 24 clamps the plate 26 against the cap 27 or clamps the plate 25 against the body 21, according to the direction of rotation. Self-alignment for both forward and reverse drive is provided by the splined mounting of the plates 25, 26.

Splines 26' allow the centering of extensions 30 in slots 29 before bolting cap 27 to housing 21, casing 21 being free to turn on cylinder 23 to align the bolt holes. Driven shaft 36 is further supported in a bearing 39 in a hub 38, and the coupling is mounted in bearings 45 and 46 carried by the transfer case.

The nut will release from the clamped clutch plate as soon as the shaft 36 tends to overrun the shaft 22, in the manner already described.

In Figure 5 is shown an assembly containing two of the last described couplings at opposite sides of a housing 121 to provide free wheeling for both the forward and rear propeller shafts 122 and 136. The housing has a ring gear 121' meshing with drive gear 1. Each clutch unit includes a pair of spaced plates 125 and 126 splined on their respective shafts 122 and 136. Between each pair of plates 125, 126 is a nut or actuating member 124 threaded on an internally threaded member 123 splined at 123' to the housing 127. The drag on these elements is obtained by a spring-pressed plunger 140 carried by each and frictionally engaging the adjacent shaft 122 or 136.

One clutch plate of each clutch unit is positioned to engage a side of the wall 121. The remaining plates are positioned to engage housing members 127. The housing parts, which must be separate for the purpose of assembly, are secured together by bolts 128.

In operation when driving straight, assuming that the shaft 136 is forward of the shaft 122, the friction of the members 140 carries the nuts 124 forward to clamp the forward clutch plate 126 against the forward member 127 and the rearward clutch plate 126 against the wall 121. On reverse drive the clutch plates 125 are clamped by the members 124 against the rear portion 127 and the forward face of the wall 121.

There is provided a construction permitting only one clutch at a time to overrun its driven shaft. When both clutches tend to overrun their shafts, they become re-engaged in the opposite direction, whereupon the overrunning driven shafts drive the drive shaft and are braked by the engine.

This mechanism includes, in addition to the friction members 140 already described, arms 130 and 130' extending in opposite directions from the members 124 with the bridge 150 secured to the arm 130 and having a longitudinal slipping connection with the arm 130'. This connection comprises a fitting 151 secured to the arm 130' and having a conical cavity 152 receiving a spring-pressed detent pin 153 carried by the bridge 150.

When the vehicle makes a turn, the forward shaft 136 rotates faster than the rear shaft 122. The forward nut 124 is released from the forward clutch plate 126 since a slight circumferential relative rotation of the forward nut is permitted by the movement of the plunger 153 in the cavity 152, while the torque of the engine maintains the clamped relation of rear nut 124 and wall 121 with rear clutch plate 126. After the forward nut is released sufficiently to permit free-wheeling of the front wheels, further circumferential relative rotation of nut 124 is prevented, since the restraining force of the detent 152—153 is sufficient to overcome the friction of members 140 tending to cause further relative rotation and opposite clutching action. If while still on the turn, the rear wheels should slip on a wet surface, they will speed up until they reach the speed of the forward wheels and restore the four wheel drive.

Should the operator release the throttle for engine braking, the ring gear 121' will slow down and the nuts 124 will tend to move out in engagement with the clutch plate 126. The construction of the bridge and the detent is such as not to oppose such simultaneous or parallel movement of the nut and they will therefore continue moving in the same direction to clamp the plates 125 and brake the driven shafts on the driving mechanism and the engine.

What I claim is:

1. In combination, a driving means, a driven member, a self-energizing coupling between said driving means and driven member adapted to permit said driven member to overrun said driving means in either direction of rotation of said driving means, said coupling comprising a driving member driven by said driving means, a screw threaded portion constrained to rotate with said driving member, a nut on said portion, a clutch face rotatable with said driving member, a clutch plate constrained to rotate with said driven member positioned between said nut and said clutch face, means for advancing said nut towards said clutch plate, on rotation of said driving means in a given direction whereby the rotation of said nut towards said clutch plate drivingly clamps said clutch plate between said nut and said clutch face to drive said driven member, and a clutch member carried by said driven member and positioned for engagement by said nut on movement away from said plate during rotation of said driving means in the opposite direction.

2. In combination, a driving means, a driven member, a self-energizing coupling between said driving means and driven member adapted to permit said driven member to overrun said driving means in either direction of rotation of said driving means, said coupling comprising a driving member driven by said driving means, a screw threaded portion constrained to rotate with said driving member, a nut on said portion, a clutch face rotatable with said driving member, a clutch plate constrained to rotate with said driven member positioned between said nut and said clutch face, means for advancing said nut towards said clutch plate, on rotation of said driving means in a given direction whereby the rotation of said nut towards said clutch plate drivingly clamps said clutch plate between said nut and said clutch face to drive said driven member, clutch members carried by said driven member and enclosing said nut and clutch face to be engaged thereby on rotation of said driving means in the opposite direction.

3. The combination of claim 1 further characterized in that said clutch plate is loosely splined to said driven member to permit self-aligning with said driving member.

4. In combination, a driving means, a driven member, a self-energizing coupling between said driving means and driven member adapted to permit said driven member to overrun said driving means in either direction of rotation of said driving means, said coupling comprising a driving member driven by said driving means, a screw threaded portion constrained to rotate with said driving member, a nut on said portion, a clutch face rotatable with said driving member, a clutch plate constrained to rotate with said driven member and positioned between said nut and said clutch face, spaced clutch members carried by said driven member, said clutch face and nut being contained between and engageable respectively with said clutch members in one direction of drive, means for advancing said nut towards said clutch plate, whereby the rotation of said nut toward said clutch plate drivingly clamps said clutch plate between said nut and said clutch face to drive said driven member, in the opposite direction.

5. In combination, a driving member, a driven member, a self-energizing coupling between said driving member and driven member adapted to permit said driven member to overrun said driving member in either direction of rotation of said driving member, comprising a plurality of clutch faces carried by each of said driving and said driven members, and means for bringing two clutch faces of said drive members into opposed thrust engagement with two clutch faces of said driven member in either direction of drive, thus neutralizing thrust pressures on the driving and driven members in either direction of rotation of said driving member.

6. The combination of claim 5, said means comprising a thread driven by said drive member, a nut on said thread and adapted to engage certain of said clutch faces, and a retarding friction device acting on said nut.

7. In combination, a driving means, a driven member, a self-energizing coupling between said driving means and driven member adapted to permit said driven member to overrun said driving means in either direction of rotation of said driving means, said coupling comprising a driving member splined to the driving means to permit axial movement of said driving member, a clutch member fixed on said driving member, a thread on said driving member, a nut rotatably mounted on said thread, an enlargement on said nut acting as a clutching member, a housing connected to said driven member and extending over said clutch member and said enlargement, internal splines in said housing, a clutch plate splined thereto and positioned between said clutch member and said enlargement, a flange on said housing presenting a clutch face adjacent to said enlargement, and friction means urging said nut in a direction to clamp said clutch plate between said enlargement and said clutch member to drive said clutch plate in one direction of rotation of said driving means, and urging said enlargement toward said flange and said clutch member towards said housing to drive said housing in the opposite direction of rotation of said driving means.

8. In combination, a driving means, a driven member, a self-energizing coupling between said driving means and driven member adapted to permit said driven member to overrun said driving means in either direction of rotation of said driving means, said coupling comprising a driving member driven by said driving means, a clutch member fixed on said driving member, a thread on said driving member, a nut rotatably mounted on said thread, an enlargement on said nut acting as a clutching member, a housing, a connection between said housing and said driven member, said housing extending over said clutch member and said enlargement, said connection permitting a small relative movement between said housing and said driven member, internal splines in said housing, a clutch plate splined thereto and positioned between said clutch member and said enlargement, a flange on said housing presenting a clutch face adjacent to said enlargement, and friction means urging said nut in a direction to clamp said clutch plate between said enlargement and said clutch member to drive said clutch plate in one direction of rotation of said driving member, and urging said nut toward said flange and said clutch member and said housing into contact to drive said housing in the opposite direction of rotation of said driving member.

9. In combination, a driving means having a plurality of clutch faces, a driven means having a plurality of clutch faces, a self-energizing coupling adapted to connect said driving means to said driven means in either direction of rotation of said driving means, said coupling comprising an actuating member movably mounted on said driving means, means operable on said actuating member to effect longitudinal movement thereof on rotation of said driving means, means responsive to longitudinal movement of said actuating member in one direction for producing clutching pressures in equal and opposite directions by a pair of said driving faces against a pair of said driven faces, said means being also responsive to longitudinal movement of said actuating member in the other direction for producing clutching pressures in equal and opposite directions by another pair of said driving faces against another pair of said driven faces.

10. In combination, a driving means having a plurality of clutch faces, a driven means having a plurality of clutch faces, a self-energizing coupling adapted to connect said driving means to said driven means in either direction of rotation of said driving means, said coupling comprising an actuating member movably mounted on said driving means, means operable on said actuating member to effect longitudinal movement thereof on rotation of said driving means, means responsive to longitudinal movement of said actuating member in one direction for producing clutching pressures in equal and opposite directions by a pair of said driving faces against a pair of said driven faces, and means responsive to longitudinal movement of said actuating member in the other direction for producing clutching pressures in equal and opposite directions by another pair of said driving faces against another pair of said driven faces, whereby to avoid residual thrust, said first named means being adapted to prevent clutching engagement between said driving and driven clutch faces when said driven means overruns said driving means.

11. In combination, a driving member and a driven member, said driving member having a clutch face, a self-energizing coupling between said driving member and driven member adapted to engage in either direction of drive, said coupling comprising an actuating member mounted on said driving member for movement lengthwise thereof, a shiftable clutch piece rotatable with said driven member, said clutch piece having two clutch faces and being disposed between said actuating member and the first named clutch face, means operable by rotation of said driving member in one direction to clamp said first named face and actuating member in opposite directions against the faces of said clutch piece, said means being operable by rotation of said driving member in the opposite direction for producing clutch pressures in equal and opposite directions between said driving and driven members.

12. In combination, a driving member and a driven member, said driven member having two opposed clutch faces, a self-energizing coupling between said driving and driven members adapted to engage in either direction of drive, said coupling comprising an actuating member movably threaded on said driving member and disposed between said faces and adjacent to one of said faces, drag means operable on said actuating member to effect longitudinal movement thereof on rotation of said driving member, and a clutch element carried by said driving member adjacent to the other of said faces, whereby the abutment of said actuating member against the first named face on rotation of said driving member in one direction propels said clutch element against the other face to provide equal and opposite thrust pressures on the respective faces.

13. The combination defined in claim 12, further characterized by a clutch piece carried by said driven member and disposed between said actuating member and said clutch element and engageable by said actuating member and clutch element, under the influence of said drag means, on rotation of said driving member in the opposite direction.

14. The combination defined in claim 12, further characterized by a clutch piece carried by said driven member and disposed between said actuating member and said clutch element and engageable by said actuating member and said clutch element, under the influence of said drag means, on rotation of said driving member in the opposite direction, said drag means being adapted to prevent clutching engagement when said driven member overruns said driving member.

15. In combination, a driving member and a driven member, said driving member having opposed clutch faces, a self-energizing coupling operable in either direction of drive, said coupling comprising an actuating member movably threaded on said driving member and disposed between said faces, drag means operable on said actuating member to effect longitudinal movement thereof in either direction according to the direction of rotation of said driving member, a shiftable clutch piece disposed between said actuating member and each of said faces, each said piece being rotatable with said driven member, whereby to be clamped between said actuating member and an adjacent face with equal and opposite pressures, on rotation of said driving member in either direction.

16. In combination, a driving body and a pair of driven shafts, a pair of self-energizing couplings between said body and said shafts operable in either direction of drive, each coupling comprising a pair of longitudinally movable actuating elements threaded to said body, and a yieldable connection between said elements permitting an initial relative movement of said elements.

17. In combination, a driving body and a pair of driven shafts, a pair of self-energizing couplings between said body and said shafts and operable in either direction of drive, each coupling comprising a pair of spaced clutch members connected with the corresponding shaft, a frictionally-retarded actuating element having a screw connection with said body for movement in either direction axially of said body according to the direction of rotation of said body, said element being disposed between said clutch members for engagement with one or the other of said members on rotation of said body in either direction and a slightly yieldable connection between said elements permitting parallel movement and an initial relative movement of said elements.

18. In combination, a driving body and a pair of driven shafts, a pair of self-energizing couplings between said body and said shafts, and operable in either direction of drive, each coupling comprising a pair of opposed clutch faces in said driving body, a frictionally-retarded actuating element having a screw drive connection with said body for movement in either direction axially of said body according to the direction of rotation of said body, said element being disposed between said faces, a shiftable clutch piece disposed between each actuating element and each of said clutch faces, each said clutch piece being rotatable with one of said shafts, whereby to be clamped between said actuating member and the adjacent face with equal and opposite pressures on rotation of said driving body, and a slightly yieldable connection between said elements permitting parallel movement and an initial relative movement of said elements.

FRANK H. BEALL.